United States Patent
Mertz et al.

(10) Patent No.: US 9,609,844 B2
(45) Date of Patent: Apr. 4, 2017

(54) SCOOPABLE LITTER SCOOPER

(71) Applicants: Dyanna Lynn White Mertz, Crestline, OH (US); John Charles Mertz, Crestline, OH (US)

(72) Inventors: Dyanna Lynn White Mertz, Crestline, OH (US); John Charles Mertz, Crestline, OH (US)

( * ) Notice: Subject to any disclaimer, the term of this patent is extended or adjusted under 35 U.S.C. 154(b) by 0 days.

(21) Appl. No.: 14/754,840

(22) Filed: Jun. 30, 2015

(65) Prior Publication Data

US 2016/0295829 A1 Oct. 13, 2016

Related U.S. Application Data

(60) Provisional application No. 62/018,975, filed on Jun. 30, 2014.

(51) Int. Cl.
*A01K 29/00* (2006.01)
*A01K 1/01* (2006.01)

(52) U.S. Cl.
CPC .................. *A01K 1/0114* (2013.01)

(58) Field of Classification Search
CPC ................................... A01K 1/0114
USPC ...... 294/1.3, 1.4, 1.5, 179; D8/10; D30/162; 209/417, 418; 119/161, 166, 867
See application file for complete search history.

(56) References Cited

U.S. PATENT DOCUMENTS

| | | | | |
|---|---|---|---|---|
| D255,951 S | * | 7/1980 | Halls | 294/1.3 |
| D309,700 S | * | 8/1990 | Goetz | D30/162 |
| 5,775,258 A | * | 7/1998 | Larsen | A01K 1/0114 119/161 |
| 6,022,058 A | * | 2/2000 | O'Rourke | A01K 1/0114 209/418 |
| 6,039,368 A | * | 3/2000 | Kowalczyk | A01K 1/0114 119/161 |
| 6,312,029 B1 | * | 11/2001 | Renforth | A01K 1/0114 209/418 |
| 6,578,807 B1 | * | 6/2003 | Lipscomb | A01K 1/0114 248/314 |
| D583,203 S | * | 12/2008 | Genest | D8/13 |

(Continued)

*Primary Examiner* — Paul T Chin
(74) *Attorney, Agent, or Firm* — Jerry Semer

(57) ABSTRACT

A litter scooper that enables the user to efficiently clean scoopable cat litter from a litter box by removing feces and large clumps of litter soiled with urine as well as the many smaller clumps. Current litter scoopers have a receptacle with only one size of aperture slots to sift the litter that allows the smaller clumps to pass through thus continuing to cause odor in the litter box. The litter scooper of this invention teaches two sizes of aperture slots. The preferred embodiment is a receptacle with rear handle, normal sized aperture slots and a section of the reduced size aperture slots to one side. The invention enables the user to sift out larger clumps of litter saturated with urine and feces by using the section with larger aperture slots and removing the smaller clumps by using the section of reduced size aperture slots. Another preferred embodiment discloses a receptacle with two angular floor sections with the handle on the side between them. The user removes larger clumps of litter saturated with urine and feces by scooping in the direction of the section with larger aperture slots and removes the smaller clumps by scooping in the opposite direction.

10 Claims, 2 Drawing Sheets

(56) References Cited

U.S. PATENT DOCUMENTS

| | | | |
|---|---|---|---|
| 7,523,973 B2 * | 4/2009 | Lin | A01K 1/0114 209/418 |
| D604,915 S * | 11/2009 | Teper | D30/162 |
| D623,807 S * | 9/2010 | Teren | D30/162 |
| D679,876 S * | 4/2013 | Teren | D30/162 |
| 2004/0090073 A1 * | 5/2004 | Edwards | A47L 13/52 294/1.3 |
| 2004/0227364 A1 * | 11/2004 | Pain | A01K 1/0114 294/1.3 |
| 2007/0267333 A1 * | 11/2007 | Delman | A01K 1/0114 209/418 |
| 2011/0042980 A1 * | 2/2011 | Wiseman, II | A01B 1/02 294/49 |

* cited by examiner

SCOOPABLE LITTER SCOOPER

BACKGROUND AND PRIOR ART

Scoopable cat litter is very popular with cat owners for the advantages over clay litter. One such advantage is that the urine forms clumps for removal rather than necessitating the need of changing all of the clay litter saturated with urine. This provides a reduction in urine odor and litter box maintenance. There are many scooper designs and configurations, but all share the common characteristic of one size of aperture slots, usually ¼ inch or larger in width, for sifting the litter. When cats cover their excrement in the litter box or when their owner scrapes the bottom to removed clumps soiled with urine adhered by cohesion, many very small clumps ¼ inch or less in diameter are created. Therefore, when the scooper removes the feces and large clumps soiled with litter, these smaller clumps fall through the slots and continue to cause odor in the litter box.

SUMMARY OF THE INVENTION

This novel litter scooper enables the user to remove the feces and larger clumps of scoopable litter that are saturated with urine as well as the many smaller clumps that would normally fall through the slots of a typical scooper receptacle back into the litter box thus continuing to cause odor. A preferred embodiment of the invention comprising a receptacle with rear handle, normal sized aperture slots and a section of reduced size aperture slots to one side enables the user to sift out larger clumps of litter saturated with urine and feces by using the section with larger aperture slots and removing the smaller clumps by using the section of reduced size aperture slots. The handle is mounted at an upward angle of approximately 30 degrees relative to the plane of the receptacle bottom to facilitate leverage in removing clumps of litter saturated with urine that are adhered to the bottom of the litter box by cohesion as well as enhancing ergonomic benefits for the user. Another preferred embodiment discloses a receptacle with two angular floor sections with the handle on the side between them. The user removes larger clumps of litter saturated with urine and feces by scooping in the direction of the section with larger aperture slots and removes the smaller clumps by scooping in the opposite direction. In this embodiment of the invention the handle is attached to the side of the receptacle at an angle of approximately 30 degrees tilted vertically relative to the plane of the base of the receptacle. This makes use of the scooper ergonomically comfortable for the user, facilitates the scooping motion and usage by left handed or right handed users.

DESCRIPTION OF THE PREFERRED EMBODIMENT

Figure 1:
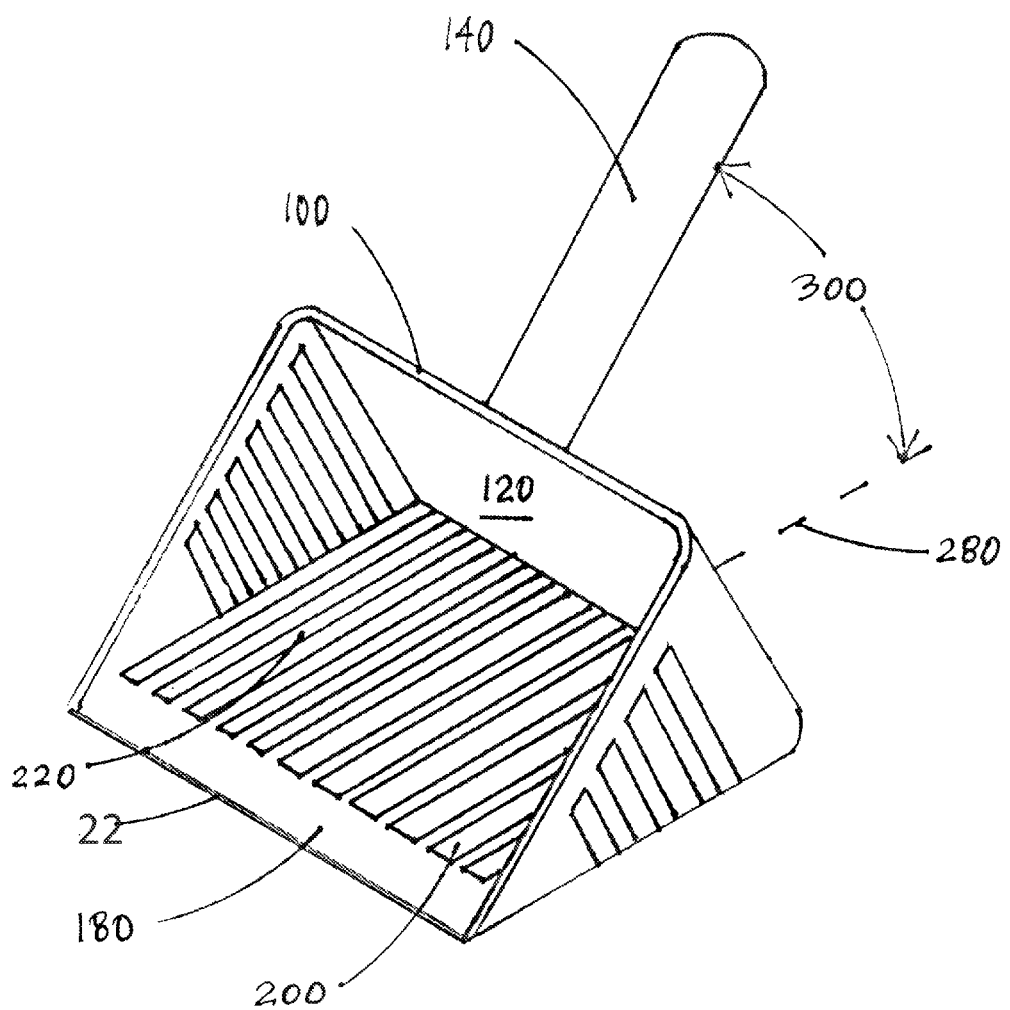
FIG. 1 shows an elevated perspective view of a preferred embodiment of the scoopable litter scooper with handle connected to the rear wall of the receptacle.

These descriptions of the preferred embodiments of this invention are only for descriptive purposes. Various designs and configurations are anticipated thus not limiting the scope of the invention. Referring to FIG. 1 of the Scoopable Litter Scooper comprising a Receptacle 100 including a Rear Wall 120 with a Handle 140 attached at an ergonomically comfortable Angle 300 relative to the Plane 280 of the Floor 180 of the Receptacle 100. Ergonomic comfort and leverage for scooping are advantages for the user provided by this configuration. The Floor 180 comprising a plurality of horizontal and parallel slots enables the user to remove feces and clumps of litter saturated with urine by sifting with a scooping motion. The user utilizes the section of Floor 180 comprising a plurality of the Larger Aperture Slots 200 of the plurality of horizontal and parallel slots with a scooping motion to remove large clumps of scoopable litter saturated with urine and feces. To remove the smaller clumps of litter saturated with urine that would normally fall through the Larger Aperture Slots 200 of the plurality of horizontal and parallel slots the user utilizes the Smaller Aperture Slots 220 of the plurality of horizontal and parallel slots. The inventors also teach that the front edge of Floor 180 has the configuration of a sharp Blade 22 to facilitate removal of urine saturated clumps of litter adhered by cohesion to the bottom of the litter box. Another element of the Receptacle 100 is a coating of Non-Stick Material (not shown) to prevent the urine saturated litter from sticking to the surface of the Floor 180 as well as the Blade 22. The inventors prefer a very durable plastic embodiment of the Scoopable Litter Scooper manufactured by injection mold technology to economically serve the needs of the consumer due to the cost effectiveness of the purchase.

Figure 2:
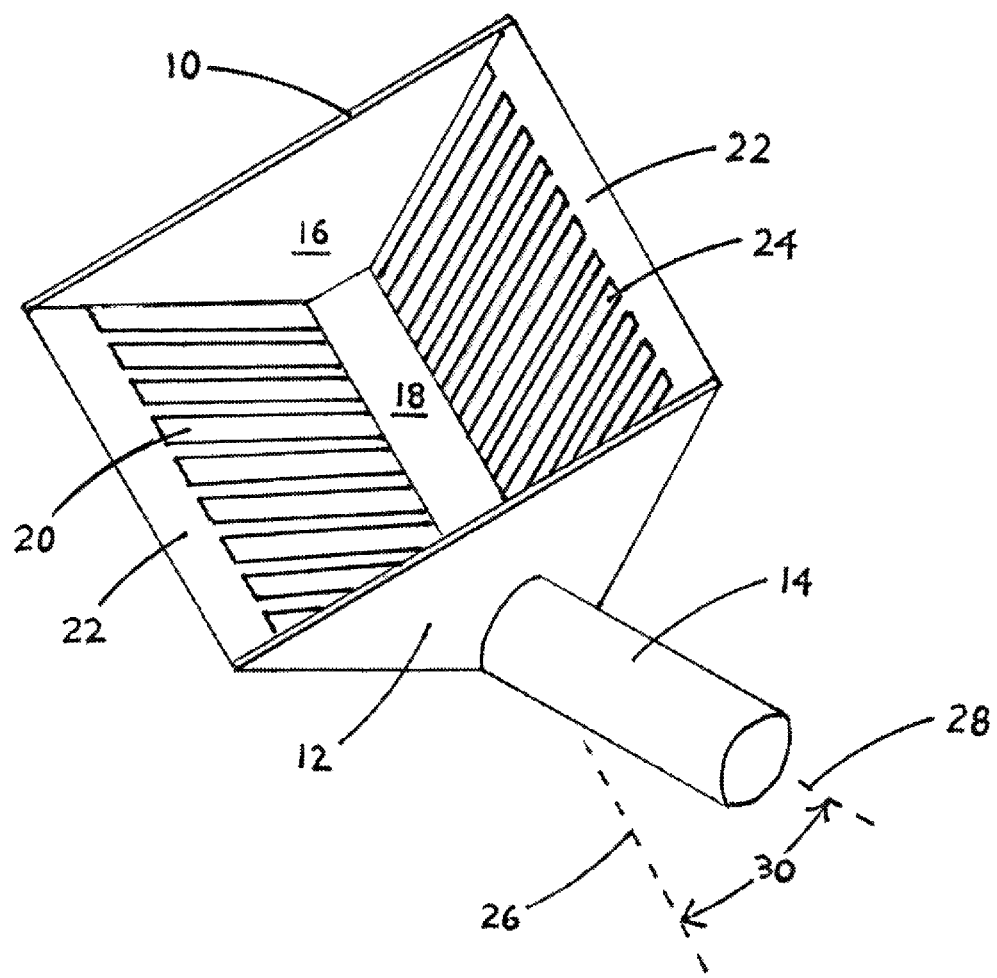
FIG. 2 illustrates an elevated perspective view of a preferred embodiment of the scoopable litter scooper with handle connected to a side wall of the receptacle.

Referring to FIG. 2 of the Scoopable Litter Scooper comprising a Receptacle 10 including a Side Wall 12 with a Handle 14 attached at an ergonomically comfortable angle to an opposite Side Wall 16 that also includes a planar Floor Section 20 with a plurality of horizontal and parallel slots to sift large clumps of litter saturated with urine and feces with an opposite Floor Section 24 with a plurality of horizontal and parallel slots to sift smaller clumps of litter saturated with urine. Said Floor Sections 20 and 24 are attached at an angle of approximately 30 degrees to the Horizontal Plane 26 of the Bottom 18 of said Receptacle 10. The front edge of Floor Sections 20 and 24 have a configuration of a sharp Blade 22 to facilitate removal of urine saturated clumps of litter adhered by cohesion to the bottom of the litter box. The Handle 14 relative to its Center Axis 28 is attached to the Side Wall 12 at an upward Angle 30 of approximately thirty degrees to the Horizontal Plane 26 of the Bottom 18 of the Receptacle 10. Ergonomic comfort and leverage for scooping are advantages provided by this configuration wherein the user is enabled to easily scoop in the direction of the Floor Section 20 with a forehand motion to remove larger clumps of scoopable litter saturated with urine and feces and with a backhand motion in the direction of the Floor Section 24 to remove the smaller clumps of litter saturated with urine that would normally fall through the larger apertures of the plurality of horizontal and parallel slots of Floor Section 20. Another element of the Receptacle 10 is a coating of Non-Stick Material (not shown) to prevent the urine saturated litter from sticking to the surface of the Floor Sections 20 and 24 as well as the configuration of sharp Blade 22. As is taught with the description of FIG. 1 the inventors prefer a very durable plastic embodiment of the Scoopable Litter Scooper manufactured by injection mold technology to economically serve the needs of the consumer due to the cost effectiveness of the purchase.

Although the descriptions above contain many specifications, these should not be construed as limiting the scope of the invention, but as merely providing illustrations of presently preferred embodiments of this invention. Thus the scope of the invention should be determined by the appended claims and legal equivalents rather than by the examples given.

We claim:

1. A litter scooper comprising:
   a. a scooper section with a back, front, and two sides; and,
   b. a first blade with a sharp edge attached to the scooper section to facilitate removal of urine saturated clumps of litter that adhered to a bottom of the litter box; and,
   c. a first section and a second section with a back and front within the scooper section and said back and front corresponds to the back and front of the scooper section; and,
   d. the first section and the second section form a bottom of the scooper section and are adjacent to each other with the first section on one side of the bottom of the scooper section and the second section is on the opposite side of the bottom of the scooper section; and,
   e. a first side wall that attaches to the side of the scooper section next to the first section; and,
   f. a second side wall that attaches the other side of the scooper section next to the second section; and,
   g. a back wall attach to the back of the scooper section and the back of first section and the back of the second section to which the handle is attached; and,
   h. the first section is covered with wider aperture slots that remove large clumps of litter; and,
   i. a second section with narrower aperture slots that remove smaller clumps of litter.

2. A litter scooper as in claim 1 wherein:
   a. the aperture slots in the first and second section are parallel.

3. A litter scooper as in claim 1 wherein:
   a. the aperture slots in the first section are a ¼ inch in width or larger.

4. A litter scooper as in claim 3 wherein:
   a. the aperture slots in the second section are less than a ¼ inch in width.

5. A litter scooper as in claim 1 wherein:
   a. the blade is attach to the front of the scooper.

6. A litter scooper as in claim 1 wherein;
   a. the first and second wall have aperture slots.

7. A litter scooper as in claim 6 wherein;
   a. the first wall has wider aperture slots that remove large clumps of litter.

8. A litter scooper as in claim 7 wherein;
   a. the second wall has narrower aperture slots that remove smaller clumps of litter.

9. A litter scooper as in claim 7 wherein;
   a. the aperture slots in the first wall are a ¼ inch in width or larger.

10. A litter scooper as in claim 7 wherein;
    a. the aperture slots in the second wall are less than a ¼ inch in width.

* * * * *